United States Patent [19]
Jakabhazy et al.

[11] 4,278,777
[45] Jul. 14, 1981

[54] GRAFTED POLYMERS AND METHOD OF PREPARING AND USING SAME

[75] Inventors: Stephen Z. Jakabhazy, Weston; Laxmidas R. Patel, Chelmsford, both of Mass.

[73] Assignee: Abcor, Inc., Wilmington, Mass.

[21] Appl. No.: 134,647

[22] Filed: Mar. 27, 1980

[51] Int. Cl.$^3$ .................. C08F 291/18; C08F 291/06; C08F 291/04
[52] U.S. Cl. .............................. 525/276; 204/159.15; 525/244; 525/256; 525/257; 525/259; 525/260; 525/262; 525/263; 525/279; 525/287; 525/292; 525/311; 525/317; 525/387; 525/391; 525/392; 525/904
[58] Field of Search .............. 525/904, 387, 276, 317, 525/263, 391, 392, 257, 260, 279, 287, 292, 311; 204/159.15

[56] References Cited

U.S. PATENT DOCUMENTS

| | | | |
|---|---|---|---|
| 3,180,908 | 4/1965 | Van Essen | 260/881 |
| 3,222,423 | 12/1965 | Roebuck | 260/877 |
| 3,376,168 | 4/1968 | Horowitz | 136/146 |

*Primary Examiner*—Carman J. Seccuro
*Attorney, Agent, or Firm*—Richard P. Crowley

[57] ABSTRACT

A dry grafting method of grafting a vinyl monomer onto a polymer, which method comprises admixing into an essentially dry, solvent-swollen, finely-divided, particulate, solid, polymer admixture, wherein the polymer has free radicals formed thereon and the admixture is essentially free of a polymerization initiator, a small grafting amount in incremental portions of a vinyl-monomer material to be grafted onto the swollen polymer, the amount of vinyl monomer sufficient to maintain an essentially free-flow, stirrable, particulate admixture, and effecting grafting of the vinyl monomer to the polymer.

17 Claims, No Drawings

GRAFTED POLYMERS AND METHOD OF PREPARING AND USING SAME

BACKGROUND OF THE INVENTION

Chemical modification of polymers by grafting with vinyl monomers has grained considerable interest during the last decades. Chemical modification of polymers is desired to impart particular and desirable properties, such as different types of charges, positive, negative, or both, antistatic properties, increase in moisture regain, increase in weather or alkali resistance, and in general improved mechanical properties, as well as thermal and stability properties, often can be imparted to a polymer by grafting onto the polymer different monomers.

Generally, the grafting of monomers onto polymers is achieved through several different mechanisms, including ionic mechanisms and chemical free-radical mechanisms. Each of the mechanisms offers various advantages and disadvantages. For example, the ionic technique has the advantage of having high grafting efficiency above about 90%. However, ionic techniques involve expensive solvent recovery, polymer concentration for grafting often is quite low, and the polymers employed must be very pure and completely dry. Such ionic systems are also usually uneconomical to develop on a large scale and are limited to polymers having tertiary-chloride benzylic or allylic chlorine groups. Free-radical mechanisms through irradiation provide for high grafting yield and higher grafting efficiency. However, the disadvantages of such mechanisms is that expensive solvent recovery is involved, there is possible degradation of the polymer due to the irradiation, and the Cobalt 60 or electron accelerator equipment employed in such irradiation techniques are costly and are not easily available on an industrial scale; thus, leading to an expensive overall process.

There are two general methods of chemical free-radical grafting to provide for graft polymers. One technique, called the "solution method", provides for dissolving the polymer either in a solvent or a monomer to be grafted, and then polymerization is carried out using peroxide as a free-radical source. This solution method provides for a very small amount of grafting, and, further, the grafting efficiency is very low, while the polymer often has limited solubility in the solvent or monomer; therefore, resulting in an expensive and limited process.

The other technique, known as the "dry grafting process", as disclosed in German Pat. No. 25 59 260 of July 14, 1977, suggests the employment of both monomer and initiators to be applied to a dry polymer powder on which the monomer is to be grafted. While this method would have practical advantages; that is, no solvent and no purification of the polymer, it has been found to give very low levels of grafting with accompanying low grafting yield.

Therefore, it is most desirable to provide a grafting method and graft polymers, particularly those polymers suitable for employment as membranes in ultrafiltration and reverse-osmosis processes and for employment for the separation of various substances, such as oil-in-water emulsions, aqueous paint, both anionic and cationic paint, lignosulfonate separations, concentration of polymer latices, separation of polyvinyl alcohol, desalinization of water, separation and recovery of whey and other techniques.

SUMMARY OF THE INVENTION

Our invention relates to a method of grafting a monomer, such as a vinyl monomer, onto polymers, to the monomer-grafted polymers produced by the method and to ultrafiltration and reverse-osmosis membranes prepared employing such polymers and to the use of such polymers in such a process. In particular, our invention relates to a new and improved method of grafting vinyl monomers onto an aliphatic carbon-hydrogen-bond-containing polymer by an essentially dry grafting technique and to the polymer so produced, particularly for use in membrane processes.

We have discovered a new and improved dry grafting process and polymers produced thereby in which the grafting of vinyl monomers of choice onto any polymer that contains an aliphatic carbon-hydrogen group takes place. Our process provides a nearly universally applicability with a wide range of polymers and vinyl monomers, in order to provide for a wide range of graft polymers suitable for use as membranes with a wide range of different properties. Our method permits the use of a polymer, to which a vinyl monomer is to be grafted, to be employed in solid, powder or particulate form and does not require solution of the polymer, and permits the use of commercial polymers, without the necessity of purifying such polymers. Importantly, our process also provides for very high levels of grafting of the vinyl monomer, typically greater than 50%. Furthermore, our process does not require harsh or demanding reaction conditions, but rather simple and effective reaction conditions, to provide for a simple, effective and high-efficiency method for grafting vinyl monomers onto polymers in an economical manner.

More particularly, our method of grafting and the graft polymers are particularly adapted to preparing polymers with different properties which can be employed as membranes, either in film, sheet, tubular, fiber or other form, and provides, for example, ultrafiltration and reverse-osmosis membrane materials with a very tight pore structure; that is, having a rejection of essentially 100% with very low-molecular-weight materials, such as 600 to 800 molecular weight.

Our method of grafting a vinyl monomer onto a polymer, having a carbon-hydrogen aliphatic group thereon, comprises contacting a swollen, essentially dry, particulate polymer with a solution containing a polymerization initiator, to permit the initiator to penetrate the swollen particulate polymer, heating the essentially dry, initiator-penetrated, swollen polymer material to a temperature sufficient to effect and to generate free radicals and to provide free radicals on the swollen polymer, and, thereafter, contacting the free-radical swollen polymer, in an essentially dry condition, with a liquid monomer to be grafted onto the polymer, thereby effecting the essentially dry-grafting of the selected monomer onto the polymer with high grafting efficiency.

In particular, our method of grafting a vinyl monomer onto a polymer comprises: swelling a solid, particulate (particularly fine powder) form of the polymer to be grafted by contacting the dry polymer powder with a swelling type of solvent, and typically not a true solvent for the polymer, but a solvent which will effect swelling, in an amount sufficient to permit the particulate polymer to swell, but not to dissolve therein, and in an amount of a solvent to provide for an essentially swollen and dry particulate polymer; contacting the swollen, essentially dry, polymer particles with a polymer-initiator solution, which maintains the essentially dry characteristics of the dry powder, but which permits the polymer initiator to penetrate into the swollen polymer particles, and which contacting is carried out while stirring the essentially dry polymer particles as the polymer-initiator solution is added; and heating the polymerization-initiator, impregnated, swollen, polymer particles to a temperature to effect free-radical generation of the initiator and to form free radicals on the swollen polymer; and contacting the free-radical, initiator, swollen polymer with a liquid monomer to be grafted, with the monomer typically being added in small incremental amounts during the course of the reaction, to provide for a very high-efficiency method of grafting vinyl monomers onto the polymer.

In our process, essentially all steps are carried out in a dry phase with swollen polymer particles. Initially, the polymer to be grafted is placed in a slurry of a swelling solvent to effect swelling of the polymer, and, thereafter, a polymerization initiator is added in a solution to permit penetration, and then the swelling-type solvent is essentially all removed. Thereafter, the polymer-initiator, impregnated polymer is swollen in an essentially dry state and is heated to effect free-radical generation of the polymer. The free-radical polymer is then admixed while stirring with small incremental amounts of the liquid monomer solution, so that the grafting reaction is carried out in an essentially dry grafting process, so that, during the polymer-contacting step, the essentially, dry, swollen polymer is stirred continuously and the individual particles roll on top of each other, while the liquid monomer is being added.

In our process, the swelling of the polymer to be grafted is essential, in order to improve dramatically and unexpectedly the grafting yield onto the polymer. The swelling of the polymer and the use of the swollen polymer in an essentially dry condition permit the polymerization initiator, in pure, bulk or liquid form, to be added to the essentially dry mixture, so that the initiator penetrates and achieves essentially uniform polymerization. It is important in our method that, during the contacting and grafting steps, only small amounts of loading of the liquid monomer occur at any one time, in order to avoid chain-transfer reactions with the monomer, itself, and to provide for higher grafting efficiency onto the polymer. During the monomer-addition step, continuous mixing, such as by stirring, is important, in order to effect high grafting yields. By our method, the initiator is employed essentially to generate free radicals on the polymer particulate surface, so that, on the addition of the monomer, there is little or essentially no polymerization initiator in the swollen polymer, other than residue products of the polymerization initiator, if applicable, so that high grafting efficiency takes place between the free radicals on the polymer and the liquid monomer added to the dry swollen polymer.

Our new unique grafting method is applicable to any polymer-containing, aliphatic, carbon-hydrogen bond, and thus only a few polymers not containing such aliphatic CH groups are not applicable for use in our method, such as, for example, polyphenylene sulfide, tetraethylene flouride, polyether sulfone and totally halogenated polymers. For example, typical polymers which may be employed in particulate form, particularly powdered form, onto which vinyl monomers may be grafted, include polymers such as, but not limited to: polyvinylidene halides like fluoride; vinyl-halide polymers and copolymers, particularly halogenated-like chlorinated polyvinyl-chloride resins; polyphenylene oxides and other polymers. The selection of the particular monomer to be employed in the grafting depends upon the type and character of the resulting grafted polymer desired. A wide variety of vinyl monomers be employed, either in pure liquid form or in solution or other form, depending upon the type of groups desired to be introduced into the resulting polymer, but typical monomers which may be employed include, but are not limited to: vinyl benzyl halides like vinyl benzyl chloride; 4-vinyl pyridine; short-chain $C_2$-$C_4$ vinyl acid esters like vinyl acetate; vinyl phosphonates, such as halogenated vinyl aliphatic phosphonates and bis (beta-chloroethyl) vinyl phosphonates; styrene and styrene derivatives and the like and combinations thereof.

The polymers, onto which the vinyl monomer is to be grafted, should be employed in finely-divided particulate form, and more paticularly as powdered particles, such as, for example, having a particle size of higher than about 80 or 100 mesh, in order to provide a mechanism for swelling the particles and to permit uniform penetration of the initiator into the polymer. The swelling solvents employed, in effecting swelling of the particulate polymer, include a wide variety of swelling-type solvents, particularly organic or inorganic swelling-type solvents, which are not true solvents for the particular polymer. True solvents would tend to dissolve the polymer or to make the solid polymer overly sticky, so that the particulate polymer would bunch together, even if employed in small amounts. True solvents may be employed, if desired, in combination with miscible or swelling-type solvents.

The particular selection of any swelling-type solvents depends in part upon the polymer being employed and its solubility characteristics and, thus, may include ketones, alcohol esters, aldehydes, aromatic and aliphatic hydrocarbons and the like, or combinations thereof. Typical swelling-type solvents employed would include specifically, but would not be limited to: low-molecular-weight, volatile, organic-type solvents, such as acetone, methylethyl ketone, ethyl acetate, tetrahydrofuran, dioxane, pyridine and pyridine derivatives and similar swelling solvents. Sufficient solvent should be added to the essentially dry particulate polymer while stirring, to effect uniform distribution of the swelling solvent and to effect swelling of the solvent particulate matter. Where desired, the polymer may be slurried in the swelling solvent and, thereafter, the swelling solvent removed, or the polymerization initiator may be added to the slurry, either alone or in an initiator solvent different or the same as the swelling solvent, and then the solvent removed after penetration of the initiator into the swollen polymer, and, thereafter, all solvent is removed after evaporation or heating.

Any suitable polymerization initiator compound may be employed to effect the particular grafting of the vinyl monomer onto the polymer. The amount employed should be sufficient to effect the desired free radicals on the polymer; that is, a polymerization-initiator amount, such as, for example, from about 0.01% to 10% by weight; for example, 0.05% to 3% by weight. Of course, if desired, free radicals on the polymer may be formed after swelling by subjecting the polymer to irradiation, but this has the disadvantage of being very expensive, and, therefore, chemical free-radical generators are the most preferred technique in our method. A wide variety of polymerization initiators may be employed, which is known to the art, but more particularly organic or inorganic peroxides are particularly effective or those compounds which, upon the application of heat, generate free radicals in the polymer, such as, for example, benzoyl peroxide, or other free-radical generators, such as azo-type compounds, such as azonitrile compounds, and more particularly azobisisobutyronitrile, alone or in combination.

The swelling of the polymer may be carried out essentially at room temperature; for example, 15° C. to 25° C., as well as the addition of the polymerization initiator to the swollen polymer, with the use of low temperatures sufficient merely to evaporate the swelling solvent. The heating of the polymerization-initiator, impregnated, swollen polymer should be sufficient to effect the generation of free radicals by the initiator, and typically can take place, depending upon the particular initiator selected, at a range of from 50° C. to 90° C., and more particularly about 60° C. to 80° C., and, thereafter, the contacting and grafting of the vinyl monomer may take place at any desired selected temperature.

Thus, for example, in one method of our process, a polymer may be slurried, for example, in a volatile solvent, such as acetone, for a period of time to effect swelling of the polymer particles without sticking together of the polymer in the slurry, and, thereafter, an acetone solution of the initiator is added in an amount to effect uniform impregnation of the initiator into the swollen particles, and, thereafter, the swelling solvent acetone is removed by evaporation into a vacuum or any degassing operation, to provide essentially swelling-solvent, acetone-free, swollen polymer particles with initiator therein. These swollen polymer particles are then heated to approximately a temperature, for example, of 60° C. to 80° C. which is sufficient to generate free radicals and to break down the initiator and to cause free-radical generation within the swollen polymer particles. Thereafter, the monomer is added with continuous stirring, so that the essentially dry polymer particles are exposed to the monomer, either a pure monomer or a monomer in solution, with the reaction conditions being essentially dry, so that the polymer particles tumble over each other in a dry, flowing manner, with the monomer added in sequential increments, to effect a high amount of grafting, with merely sufficient heating or under such conditions as to effect grafting of the vinyl monomer onto the polymer.

The resulting grafted polymers, having the desirable properties, then may be employed as membranes or other uses, such as, for example, by dissolving the polymer in a solvent solution, casting the solvent solution into a film or other form, partially evaporating the solvent, immersing the cast, partially evaporated film of the graft polymer into a leaching bath, and recovering the film as a membrane.

It should be noted that the heating of the swollen polymer particles, to generate free radicals on the particles and to remove essentially the initiator or to leave initiator residues only, provides for a polymer with free radicals which have a discernible half-life, so that, after heating, it is desirable, within the half-life span of the polymer radical, such as from 5 minutes to 12 hours; for example, 3 to 4 hours, to effect the addition of the monomer, so that, in effect, in our method, the vinyl monomer essentially contacts only the free radicals on the polymer and does not contact the initiator, per se. Our method provides for very efficient grafting, typically over 40%, and essentially is a dry-reaction-mixture method which overcomes the disadvantages associated with prior-art, chemical, free-radical grafting techniques.

Our method and the resulting graft polymers and their use as membranes will be described in connection with certain embodiments, and it is recognized that those persons skilled in the art may make various changes and modifications in connection with those illusrative embodiments, all falling within the spirit and scope of our invention.

DESCRIPTION OF THE EMBODIMENTS

Example 1—Grafting onto PVDF

A. Grafting of vinyl benzyl chloride (VBC)

300 gms of powdered (mesh 100) Solef polymer (a trademark of Solvay Co. for a polyvinylidene fluoride) and approximately 1000 mls of acetone were added into a 2-liter flask. With gentle mixing, the powdered polymer was allowed to swell, while immersing the flask in hot water. 4.5 g of a polymerization initiator of AIBN, dissolved in about 200 ml of acetone, were mixed into the cooled (about 25° C.), acetone, swollen resin. The polymer was emptied into a drying tray, and the polymer was allowed to dry overnight in a hood.

The polymer was transferred into a 1-liter kettle and was degassed and then filled with nitrogen, this sequence being repeated three times. The kettle was lowered into an oil bath at a temperature of 65° C., while $N_2$ was flowing through the polymer. The heating was continued for about 3½ hours. 60.0 g of VBC (inhibitor-free) were added slowly into the flask. The stirring speed was maintained at about 100 rpm. The temperature of the heating-oil bath was maintained at around 70° C. The heating was continued for another 4 hours after the first shot of VBC addition. The second shot of VBC (90 g) was added dropwise into the polymer at this point. The heating and stirring were still further continued for another 14 hours. The polymerization was stopped at this stage. The product was washed with hot toluene three times and was dried in a vacuum oven at about 50° C. overnight. Samples of this product, unwashed and washed, were sent for chlorine analysis, from which the percent grafting of VBC was calculated.

B. Grafting of 4-vinyl pyridine (4 VP)

The same grafting procedure was adapted as for the VBC monomer in A. The polymer-to-AIBN ratio was the same as described in the VBC grafting technique. Distilled 4 VP was used for grafting. The product was washed three times with hot methanol. The dried sample was analyzed for nitrogen content, which was used to calculae the amount of grafting.

C. Grafting of styrene

The styrene was washed three times with about 10% NaOH and distilled water, was distilled at a low temperature (about 30° C.) and was stored in a refrigerator for further use. The procedure for grafting styrene was the same as the VBC procedure. The amount of grafting was calculated gravimetrically and from NMR.

D. Grafting of bis (beta-chloroethyl) vinyl phosphonate (VPh)

Swelling of 100 g of Solef powder was carried out in the same manner as described in the previous experimental procedure. 1.5 g of AIBN and 25 g of Fyrol (a trademark of Stauffer Chemical Co.) were diluted in acetone and were mixed with the swollen polymer. The polymer, free from acetone, was dried overnight.

The polymer was transferred into a 1-liter kettle. Degassing was carried out three times. Nitrogen was purged slowly through the polymer kettle. The kettle was lowered in an oil bath, which was at room temperature (about 30° C.), at this point. The stirring (about 100 rpm) of the polymer was maintained throughout the polymerization reaction. The temperature of the oil bath was increased gradually to 70° C. over 4 hours. The temperature was held for an additional 1 hour at 70° C. before adding another shot of 25 g Fyrol. Polymerization continued for another 15 hours at 70° C. Afterwards, the product was removed from the kettle, was washed three times with warm methanol and was dried in a vacuum oven at about 50° C. overnight. A sample was sent for chlorine analysis to determine the amount of grafting.

Example 2—Grafting onto chlorinated polyvinyl cloride (CPVC)

A. Grafting of vinyl benzyl chloride (VBC)

300 g of CPVC were swollen in about 500 ml of acetone containing 10% methylene chloride. 4.5 g of AIBN, dissolved in about 100 ml of the above solvent mixture, were mixed into the swollen polymer. The polymer was poured into a drying tray and was left in the hood overnight for the acetone to evaporate.

The polymer was transferred into a 1-liter kettle, degassed and slowly, but continuously, purged with $N_2$. The kettle was lowered into an oil bath which was kept at 68° C. to 70° C. Stirring was maintained at about 100 rpm. The heating was continued for 4 hours. The first shot of 100 g of VBC was added slowly. The heating and stirring continued for another 4 hours. At this point, a second shot of 50 g of VBC was added. The product was washed three times with a warm acetone/MEK mixture (1:1). The sample was sent for chloride analysis to determine the level of grafting.

Example 3—Grafting onto polyphenylene oxide (PPO)

A. Grafting of VBC 300 g of powdered PPO were swollen in 600 mls of warm acetone toluene (1:1). 4.5 g of AIBN, dissolved in an acetone-toluene solvent, and gms of VBC were mixed into the swollen polymer at room temperature. The polymer was poured into a drying tray and was dried overnight in the hood.

The polymer was transferred into a 1-liter flask, degassed and purged slowly with $N_2$. The kettle was lowered into an oil bath which was at room temperature (about 30° C.). The temperature was gradually increased to 65° C. over 4½ hours. At this point, 100 g of VBC were added dropwise over a period of 1 hour. The temperature was held at 68° C. for another 14 hours. The product was removed from the kettle, was washed two times with hot MEK and was dried in an oven at 40° C. overnight. A sample was sent for chlorine analysis.

The results of Examples 1, 2 and 3 are as follows:

| Polymer | Monomer | Degree of Grafting | Monomer structure |
|---|---|---|---|
| PVDF Ex.1 | A VBC | 55 | 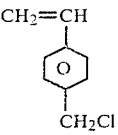 |
| | B 4-VP | 65 | 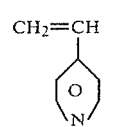 |
| | C VPh | 25 | 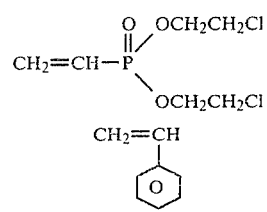 |
| | D Styrene | 45 | 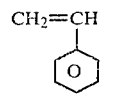 |
| CPVC Ex. 2 | VBC | 40 | |
| PPO Ex. 3 | VBC | 40 | |

PVDF is a polyvinylidene-fluoride polymer.
CPVC is a chlorinated polyvinyl-chloride polymer.
PPO is a polyphenylene-oxide polymer.
VBC is a vinyl-benzyl chloride.
4-VP is a 4-vinyl pyridine.
VPh is for bis (beta-chloroethyl) vinyl phosphonate.
AIBN is a polymerization initiator of azobisisobutyronitrile.

Polymerization of vinyl monomers; for example, VBC, initiated by AIBN in the presence of polymers; for example, PVDF, was found to bring about an increase in the weight of these polymers, even after extracting the latter several times with toluene, which is a solvent to the homopolymer of VBC. The increase in weight is due to incorporation of vinyl polymer with the PVDF polymer. The mechanism of polymerization onto PVDF is believed to be grafting by vinyl addition to a PVDF radical formed under the influence of AIBN.

We have found that the effect of swelling versus nonswelling of the polymer prior to grafting is quite dramatic. The difference in precent grafting was seen by comparing the results set forth with the reaction carried out without swollen polymer. The percent grafting for the swollen-polymer technique went up by more than tenfold. Since the grafting is diffusion-controlled, this dramatic increase in grafting is believed to be due to larger surface area now available to the monomer to penetrate easily into the polymer particles and faster diffusion of the monomer into the swollen polymer.

It was observed that increases in the AIBN concentration from 1.0% up to 1.5% were accompanied by a substantial increase in the graft yield, while concentration larger than 1.5% lowers grafting yield slightly. It has been observed that adding too much monomer in the first addition tends to lower the grafting yield. Thus the monomer should be added in increments, typically in one, two, three, four or more equal increments.

It has been discovered that certain monomers, which have a solvent or swelling effect, per se, on the polymer particles, such as 4-vinyl pyridine, can be grafted onto PVDF with higher yield than other monomers (for example, Fyrol or VBC). It is believed that the monomer which can solvate the polymer more may diffuse more easily into the polymer; thus, yielding higher grafting results. Continuous stirring during addition of the monomer is quite essential to achieve high grafting yield. Since the polymer is a poor heat conductor, only good stirring can ensure good heat transfer to the bulk of the polymer to be grafted.

It has been found that membranes prepared from the graft polymers resulting from our method show particular promise in a variety of ultrafiltration membrane-separation/recovery applications. For example, it has been found that the graft chlorinated polyvinyl chloride grafted with vinylbenzyl chloride provides for a cast membrane having particular use in the separation of aqueous cationic paints. It has been found that the graft polymer provides for a highly reactive chloride for substitution to produce a positively charged species.

It has been found that a membrane, cast from the graft polymer in an aprotic solvent onto a backing and then partially evaporated and leached, displays a very high process flux with cationic paint; for example, 118 gfd water flux, with a relatively low fouling coefficient. Thus the graft polymer with the chloride group is substituted by reaction with a tertiary amine to quaternize the graft polymer, which graft polymer, containing the quaternary ammonium group, is particularly effective for use in aqueous cationic-paint separations. It also has been found that PVDF-grafted vinylbenzyl-chloride membranes, with triethanol amine quaternization on the membranes, provides for a quaternized polymer having suitable membrane properties for the separation of aqueous cationic paints, and such membranes display good process flux, low membrane resistance and low fouling coefficients. The graft polymers resulting from our method have been described as useful as membranes; however, our graft polymers have a number of uses, including use as an ion-exchange resin, for preparing dyeable fibers and membranes and other uses, wherein graft polymers with particular characteristics and properties may be useful.

What we claim is:

1. A method of dry-grafting, with high grafting efficiency, a vinyl monomer onto a polymer having an aliphatic carbon-hydrogen group, which method comprises:
   admixing into an essentially dry, solvent-swollen, finely-divided, particulate, solid, polymer admixture, wherein the polymer has free radicals formed thereon and the admixture is essentially free of a polymerization initiator, a small grafting amount in incremental portions of a vinyl monomer material to be grafted onto the swollen polymer, the amount of vinyl monomer sufficient to maintain an essentially free-flow, stirrable, particulate admixture, and effecting grafting of the vinyl monomer to the polymer.

2. The method of claim 1 wherein the polymer comprises a polyvinylidene-fluoride polymer, a polyphenylene-oxide polymer and a vinyl-chloride polymer, or combinations thereof.

3. The method of claim 1 wherein the vinyl monomer comprises a vinyl pyridine, a vinylbenzyl chloride, styrene, a vinyl phosphonate, vinyl acetate or combinations thereof.

4. The method of claim 1 which includes admixing the vinyl monomer into the swollen particulate polymer in a series of incremental additiona, with polymerization grafting occurring between each addition step.

5. The method of claim 4 which includes continuously stirring the essentially dry, particulate admixture during the adding step and the grafting reaction step.

6. A method of dry-grafting, with a high degree of grafting efficiency, a vinyl monomer onto a finely-divided, particulate, solid polymer having an aliphatic carbon-hydrogen group thereon, which method comprises:
   (a) solvent-swelling the finely-divided, particulate, solid polymer which is to be grafted, to provide an essentially dry, flowable, particulate admixture of the polymer;
   (b) contacting, while stirring, the swollen solid polymer with a small, but effective, amount of a polymerization initiator, to permit the initiator to penetrate the swollen-polymer particulate material;
   (c) heating the swollen, initiator-containing, particulate polymer to a temperature sufficient to decompose essentially all of the initiator and to form a free-radical-containing, swollen, particulate, polymer admixture essentially free of initiator; and
   (d) adding in incremental steps a small grafting amount of a vinyl monomer to the essentially dry, flowable, swollen, polymer admixture, while continuously stirring the admixture, to effect the essentially dry-grafting of the vinyl monomer to the swollen, particulate, polymer material.

7. The method of claim 6 wherein the polymer comprises a polyvinylidene-fluoride polymer, a polyphenylene-oxide polymer and a vinyl-chloride polymer, or combinations thereof.

8. The method of claim 6 wherein the vinyl monomer comprises a vinyl pyridine, a vinylbenzyl chloride, styrene, a vinyl phosphonate, vinyl acetate, or combinations thereof.

9. The method of claim 6 which includes admixing the vinyl monomer into the swollen particulate polymer in a series of incremental additions, with polymerization grafting occurring between each addition step.

10. The method of claim 6 which includes continuously stirring the essentially dry, particulate admixture during the adding step and the grafting reaction step.

11. The method of claim 6 which includes swelling the particulate polymer by slurrying the particulate polymer in a volatile, solvent-swelling solution, adding the polymerization initiator to the slurry, and evaporating the swelling solvent, to provide an essentially solvent-free, dry, flowable admixture of the solid polymer.

12. The method of claim 6 which includes heating the initiator-containing polymer to a temperature of about 50° C. to 90° C.

13. A method of dry-grafting, with a high degree of grafting efficiency, a vinyl monomer, selected from the group consisting of a vinyl pyridine, a vinylbenzyl chloride, styrene, a vinyl phosphonate, vinyl acetate or combinations thereof, onto a finely-divided, particulate, solid polymer selected from the group consisting of a polyvinylidene-fluoride polymer, a polyphenylene-oxide polymer and a vinyl-chloride polymer or combinations thereof and having an aliphatic carbon-hydrogen group thereon, which method comprises:

(a) solvent-swelling the finely-divided, particulate, solid polymer which is to be grafted, to provide an essentially dry, flowable, particulate admixture to the polymer;

(b) contacting, while stirring, the swollen solid polymer with a small, but effective, amount of a polymerization initiator, to permit the initiator to penetrate the swollen-polymer particulate material;

(c) heating the swollen, initiator-containing, particulate polymer to a temperature sufficient to decompose essentially all of the initiator and to form a free-radical-containing, swollen, particulate, polymer admixture essentially free of initiator; and (d) adding in incremental steps, while continuously stirring the essentially dry, particulate admixture during the adding step and the grafting reaction step, a small grafting amount of a vinyl monomer to the essentially dry, flowable, swollen, polymer admixture, to effect the essentially dry-grafting of the vinyl monomer to the swollen, particulate, polymer material.

14. The method of claim 13 wherein the vinyl monomer is selected from the group consisting of vinylbenzyl chloride, 4-vinyl pyridine, styrene and bis (beta-chloroethyl) vinyl phosphonate.

15. The method of claim 6 wherein the initiator comprises a free-radical-generating azonitrile, a peroxide, or combinations thereof, and which comprises from about 0.01% to 15% by weight of the polymer.

16. The method of claim 6 which includes swelling the solid particulate polymer by the addition of a small amount of a swelling solvent thereto, while stirring the essentially dry polymer admixture, and, thereafter, adding a polymerization initiator in a small amount of a swelling solvent, and stirring the admixture during addition, to effect the substantially uniform penetration of the swollen polymer with the initiator.

17. The method of claim 6 wherein the swelling solvent comprises acetone, methylethyl ketone, dioxane, tetrahydrofuran or ethyl acetate.

* * * * *